J. E. SMITH.
Improvement in Current-Reversers and Circuit-Breakers.
No. 129,607. Patented July 16, 1872.

Witnesses

J. E. Smith.

129,607

UNITED STATES PATENT OFFICE.

JOHN E. SMITH, OF NEW YORK, N. Y.

IMPROVEMENT IN CURRENT-REVERSERS AND CIRCUIT-BREAKERS.

Specification forming part of Letters Patent No. 129,607, dated July 16, 1872.

Specification describing a Spark-Arresting Circuit-Breaker and Current-Reverser for Electrical Machines, the invention of JOHN E. SMITH, of the city, county, and State of New York.

Heretofore the methods adopted for the reversal of electric currents by a single apparatus—half the impulses going in one direction and half in the opposite direction alternately—have used but one battery, and have changed the direction of the current by a reversal of the connections of the poles of such battery with the circuit operated on.

My invention consists, first, in the location of two similar batteries, with their like poles connected to the circuit in opposite directions, and combined with a circuit-breaking apparatus, so that the current is reversed by simply changing one end of the circuit from one battery to the other. Secondly, the invention consists in a combination of one or more resistance-coils or means and one or more branch circuits with the battery or batteries and a circuit-breaker in such manner as to greatly diminish the electric spark that takes place upon each interruption of the current, and so do away with the burning or injuring of the springs used to break or reverse the current.

Figure 1:
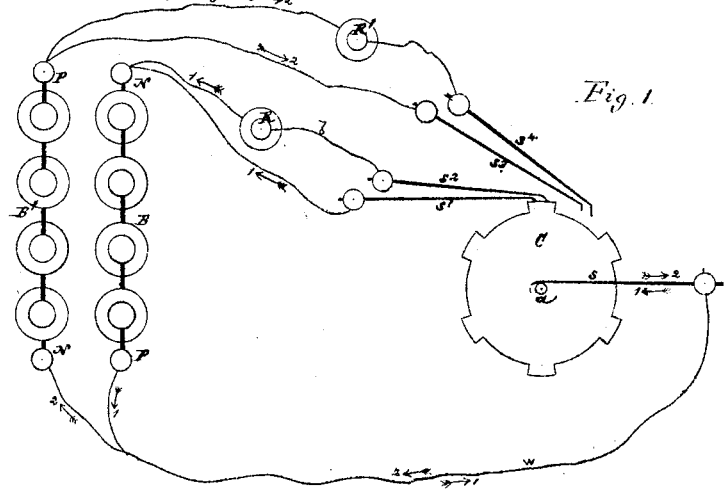
Figure 2:
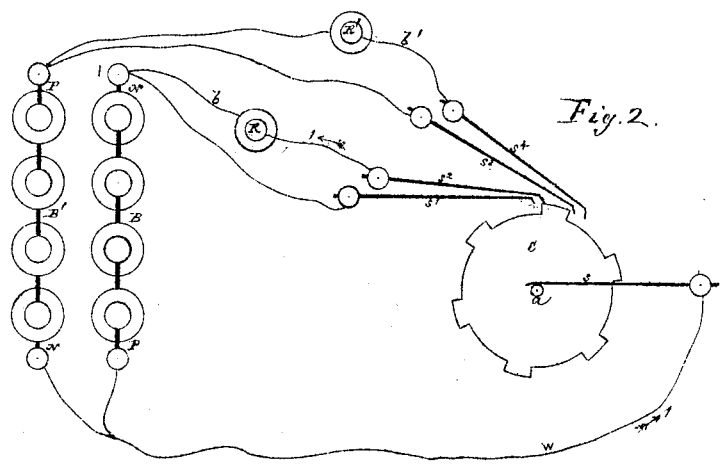
Figure 3:
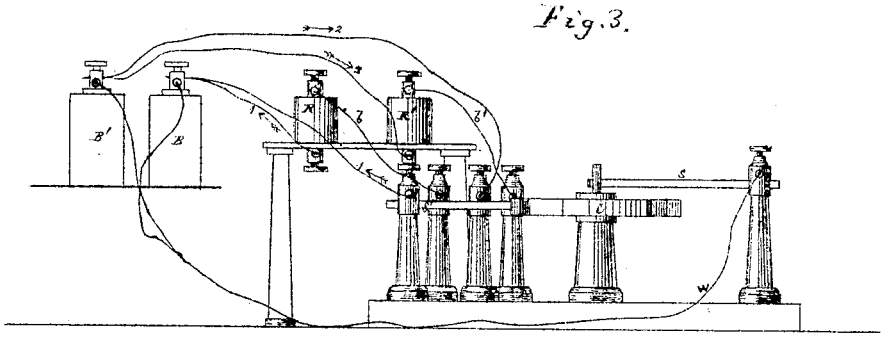

In the accompanying drawing, which forms a part of this specification, Figures 1 and 2 represent plans of an apparatus in illustration of my invention, with certain parts or springs in different positions relatively to the circuit-breaking wheel. Fig. 3 is an elevation of the same.

Similar letters of reference indicate corresponding parts.

C is a circuit-breaking wheel, which may be of metal and be supported by any suitable frame, and which has any desired number of teeth. Said wheel may be rotated by hand or by means of clock-work driven by a weight, spring, or any other convenient power. Against its shaft $a$ rests a metallic spring, $s$, to which is connected one end of the wire W, over which a current is to be reversed; or said wire may be attached to the frame (when metallic) that supports the circuit-breaking wheel. To the other end of the wire W are permanently connected unlike poles of two similar batteries, B B'. The insulated metallic spring $s^1$, for making and breaking circuit with the wheel C, is connected with the negative pole of the battery B by as short a wire as is convenient. A similar spring, $s^2$, is arranged to make and break contact with the wheel C shortly after the spring $s^1$ does so; and this spring $s^2$ also connects, by a separate wire, branch, or derived circuit $b$, with the same pole of the same battery; but in this branch circuit is placed a resistance, R, which should be several times that of the whole circuit proper. In precisely the same manner communication is established between the positive pole of the battery B¹ and the wheel C, by means of similar springs, $s^3$ $s^4$, a resistance, R', and the necessary wire connections, including a branch or derived circuit, $b'$. These two sets of springs, $s^1$ $s^2$ and $s^3$ $s^4$, are so arranged that while one set is making electrical contact at or near the center of one of the teeth of the wheel C the other set falls at or near the middle of one of the spaces between the teeth, and these spaces are so much larger than the teeth that the latter cannot connect with both batteries at the same moment. In considering the manner in which the current is reversed no reference need be made to the springs $s^2$ $s^4$, the resistances R R', and their connections, as the sole office of these several devices is to diminish the spark.

It will readily be seen that whenever the circuit-wheel C is in the position shown in Fig. 1 a circuit will be established through battery B, and the current will pass as indicated by arrows 1. Now, if the wheel C turn to the right half a tooth, it will be clear that its connection with the negative pole of battery B will be broken and established with the positive pole of battery B', thereby causing the current to flow in the opposite direction, as shown by arrows 2. As each battery is thus on open circuit over half the time the negative-plates will not polarize to such an extent as if the currents in both directions were taken from one battery; and the completion of the circuit being made by a single closing the chances of failure are only half as great as in the reversal of the poles of one battery, in which latter case there are two points where the circuit is opened and closed. When the springs $s^1$ $s^3$ are the only ones employed to open and close circuit, a spark of greater or less brilliancy will show itself between these springs and the wheel C each time the current is interrupted. With twelve or fifteen magnets in circuit, and twenty-five or more cells in each battery, the induced current from the discharge of the magnet is powerful enough to bridge over about a quarter-inch break, and, this accomplished, the primary current is enabled to follow in the track of the secondary, thereby burning the springs the same as if they had been brought into contact with each other and then slowly separated. The use of the springs $s^2$ $s^4$ and the resistances R R' greatly diminishes the spark, as follows: When the wheel C is in the position shown in Fig. 1, only a small portion of the current passes over the spring $s^2$ because of the resistance R. As the circuit-wheel C advances and leaves the spring $s^1$, as represented in Fig. 2, the principal portion of the entire current will be interrupted, but only a feeble spark will appear, because whatever current, primary or secondary, then exists will, in the main, pass through the resistance R and over the spring $s^2$ in preference to darting through the air. By the time that connection with spring $s^2$ is broken the magnets and the current will have been so weakened by the resistance R that no spark of moment will show itself on this the complete interruption of the circuit. The action of the springs $s^3$ $s^4$ and resistance R' is in every respect the same as that just described for the springs $s^1$ $s^2$ and the resistance R.

Instead of one supplemental spring, $s^2$ or $s^4$, and resistance R or R', to each battery, several may be employed in a similar manner, and arranged so that no two shall make or break circuit at the same moment. This will cause the reduction of the spark to be still more marked. Such method of diminishing the spark is applicable to all kinds of circuit-breakers.

What is here claimed, and desired to be secured by Letters Patent, is—

1. The combination of two batteries with a circuit and a circuit-breaker, when said batteries have their poles arranged in relation with the circuit substantially as described, and for the purpose herein set forth.

2. The combination, with a circuit-breaker, of a branch or derived circuit or circuits, one or more resistances, and one or more supplemental springs, essentially as and for the purpose specified.

3. The resistances R R' and springs $s^2$ $s^4$, in combination with the two batteries B B' and circuit-breaker, substantially as described.

J. E. SMITH.

Witnesses:
FRED. HAYNES,
R. E. RABEAU.